(12) United States Patent
Nakama et al.

(10) Patent No.: US 11,199,667 B2
(45) Date of Patent: Dec. 14, 2021

(54) OPTICAL-FIBER-ATTACHED FERRULE AND METHOD OF MANUFACTURING THE SAME

(71) Applicant: FUJIKURA LTD., Tokyo (JP)

(72) Inventors: Akihiro Nakama, Chiba (JP); Shigeo Takahashi, Chiba (JP); Hirotaka Asada, Chiba (JP)

(73) Assignee: Fujikura Ltd., Tokyo (JP)

( * ) Notice: Subject to any disclaimer, the term of this patent is extended or adjusted under 35 U.S.C. 154(b) by 769 days.

(21) Appl. No.: 16/068,875

(22) PCT Filed: Mar. 15, 2017

(86) PCT No.: PCT/JP2017/010318
§ 371 (c)(1),
(2) Date: Jul. 9, 2018

(87) PCT Pub. No.: WO2017/159710
PCT Pub. Date: Sep. 21, 2017

(65) Prior Publication Data
US 2021/0208343 A1    Jul. 8, 2021

(30) Foreign Application Priority Data
Mar. 16, 2016    (JP) .............................. JP2016-052792

(51) Int. Cl.
*G02B 6/38* (2006.01)

(52) U.S. Cl.
CPC ......... *G02B 6/3861* (2013.01); *G02B 6/3853* (2013.01)

(58) Field of Classification Search
CPC ............................. G02B 6/3861; G02B 6/3853

USPC ............................................................ 385/79
See application file for complete search history.

(56) References Cited

U.S. PATENT DOCUMENTS

| 5,420,952 A * | 5/1995 | Katsura ................ G02B 6/3834 |
| | | 385/80 |
| 2006/0093279 A1* | 5/2006 | Plotts .................... G02B 6/3885 |
| | | 385/80 |
| 2011/0075975 A1 | 3/2011 | Wang et al. |
| 2011/0317959 A1 | 12/2011 | Ohta et al. |
| 2012/0093462 A1 | 4/2012 | Childers et al. |

(Continued)

FOREIGN PATENT DOCUMENTS

| EP | 624808 A1 | 11/1994 |
| JP | H06-337328 A | 12/1994 |

(Continued)

OTHER PUBLICATIONS

Office Action issued in Chinese Application No. 201780005022.9, dated May 5, 2019 with English Translation (13 pages).

(Continued)

*Primary Examiner* — Jerry M Blevins
(74) *Attorney, Agent, or Firm* — Osha Bergman Watanabe & Burton LLP (57) ABSTRACT

An optical-fiber-attached ferrule includes: an optical fiber hole into which an optical fiber is inserted and fixed with a first adhesive; and an adhesive-filling section including an opening surface and an opposed surface opposite the opening surface. The adhesive-filling section is filled with a second adhesive that is softer than the first adhesive with an end surface of the optical fiber positioned closer to the opposed surface than to the opening surface.

15 Claims, 9 Drawing Sheets

(56) References Cited

U.S. PATENT DOCUMENTS

| | | | | |
|---|---|---|---|---|
| 2014/0270641 A1* | 9/2014 | Sheu | ................... | G02B 6/4239 385/33 |
| 2015/0023636 A1* | 1/2015 | Moriyama | ........... | G02B 6/3885 385/84 |
| 2015/0198771 A1 | 7/2015 | Nakama et al. | | |

FOREIGN PATENT DOCUMENTS

| | | | |
|---|---|---|---|
| JP | H11-084164 | A | 3/1999 |
| JP | 2014-085417 | A | 5/2014 |
| JP | 5564344 | B2 | 7/2014 |
| JP | 2015-22130 | A | 2/2015 |

OTHER PUBLICATIONS

Office Action issued in corresponding Japanese Patent Application No. 2016-052792 dated Dec. 6, 2016, with translation (5 pages).
Extended European Search Report issued in corresponding European application No. 17766706.0 dated Jun. 25, 2019 (8 pages).

* cited by examiner

PEEL OFF (AIR LAYER)

HARDENED ADHESIVE (HARDENED REFRACTIVE INDEX-MATCHING MATERIAL)

FIG. 3B (COMPARATIVE EXAMPLE)

FIG. 4

FIG. 5A (FIRST MODIFICATION)

FIG. 5B (FIRST MODIFICATION)

FIG. 6A (SECOND MODIFICATION)

FIG. 6B (SECOND MODIFICATION)

FIG. 7A (SECOND MODIFICATION)

FIG. 7B (SECOND MODIFICATION)

OPTICAL-FIBER-ATTACHED FERRULE AND METHOD OF MANUFACTURING THE SAME

TECHNICAL FIELD

This invention relates to an optical-fiber-attached ferrule and a method of manufacturing the same.

BACKGROUND

As a ferrule to hold end portions of optical fibers, there has been known the ferrule that includes an adhesive-filling section having an opening from which an adhesive is filled, and the adhesive is filled in the adhesive-filling section to fix the optical fibers. Patent Literature 1 discloses that an adhesive is filled and hardened in an adhesive-filling section while end surfaces of optical fibers are caused to abut onto an inner wall of the adhesive-filling section of a ferrule.

CITATION LIST

Patent Literature

Patent Literature 1: Japanese Patent Publication No. 5564344

After an adhesive-filling section is filled with an adhesive and the adhesive is hardened, in the case where a ferrule deforms by an environmental change due to, for example, high temperature and high humidity, end surfaces of fibers peel off from an abutting surface of an inner wall of the adhesive-filling section, possibly resulting in increase in transmission loss.

SUMMARY

One or more embodiments of the present invention provide an optical-fiber-attached ferrule that can suppress transmission loss.

One or more embodiments of the present invention are an optical-fiber-attached ferrule including:

an optical fiber hole into which an optical fiber is inserted; and an adhesive-filling section including an opening surface of the optical fiber hole and an opposed surface opposed to the opening surface, wherein the optical fiber is fixed in the optical fiber hole with a first adhesive, the adhesive-filling section is filled with a second adhesive that is softer than the first adhesive with an end surface of the optical fiber located closer to the opposed surface than to the opening surface.

Other features of embodiments of the present invention will be made clear by the Description and Drawings described below.

According to one or more embodiments of the present invention, transmission loss can be suppressed.

DETAILED DESCRIPTION OF EMBODIMENTS

At least below matters will become clear from descriptions in this specification and attached drawings.

An optical-fiber-attached ferrule will become clear, including: an optical fiber hole into which an optical fiber is inserted; and an adhesive-filling section including an opening surface of the optical fiber hole and an opposed surface opposed to the opening surface, wherein the optical fiber is fixed in the optical fiber hole with a first adhesive, the adhesive-filling section is filled with a second adhesive that is softer than the first adhesive with an end surface of the optical fiber located closer to the opposed surface than to the opening surface. According to this optical-fiber-attached ferrule, transmission loss can be suppressed.

The second adhesive has a shore hardness D of equal to or smaller than 50 according to one or more embodiments of the present invention. In this way, the increased amount of loss of the optical fiber during a predetermined environmental change can be reduced to equal to or smaller than 0.3 dB.

A difference in refractive index with the optical fiber is greater for the first adhesive than for the second adhesive according to one or more embodiments of the present invention. Further, light transmittance of the first adhesive is lower than that of the second adhesive according to one or more embodiments of the present invention.

A depth of the adhesive-filling section is equal to or greater than half a thickness of a ferrule body portion according to one or more embodiments of the present invention. In such a case, the ferrule is particularly effective.

The optical-fiber-attached ferrule includes a recess site recessed with respect to an end surface of the ferrule; and a lens section formed to the recess site, the lens section being disposed corresponding to the optical fiber hole, according to one or more embodiments of the present invention. This eliminates a physical contact between the mutual optical fiber end surfaces, ensuring enhancing durability.

A ventilation hole is formed in the adhesive-filling section according to one or more embodiments of the present invention. Accordingly, an air bubble is less likely to be formed in the adhesive-filling section when filling the second adhesive.

An opening is formed to a bottom of the adhesive-filling section, and the adhesive-filling section penetrates the ferrule, according to one or more embodiments of the present invention. In this way, deformation of the ferrule can be suppressed.

A size of the opening formed to the bottom of the adhesive-filling section is such that the second adhesive does not leak due to surface tension of the second adhesive according to one or more embodiments of the present invention. In this way, leakage of the second adhesive can be suppressed.

A method of manufacturing an optical-fiber-attached ferrule will become clear, including: (1) preparing a ferrule that includes an optical fiber hole into which an optical fiber is inserted, and an adhesive-filling section including an opening surface of the optical fiber hole and an opposed surface opposed to the opening surface; (2) fixing the optical fiber in the optical fiber hole with a first adhesive; and (3) filling the adhesive-filling section with a second adhesive that is softer than the first adhesive with the end surface of the optical fiber being located closer to the opposed surface than to the opening surface. According to such a manufacturing method, transmission loss can be suppressed.

After the optical fiber is fixed in the optical fiber hole with the first adhesive, in a state an end surface of the optical fiber is located closer to the opposed surface, the second adhesive is filled in the adhesive-filling section according to one or more embodiments of the present invention. In this way, the work of filling the second adhesive in the adhesive-filling section will become easier.

<Configuration>

Figure 1A:
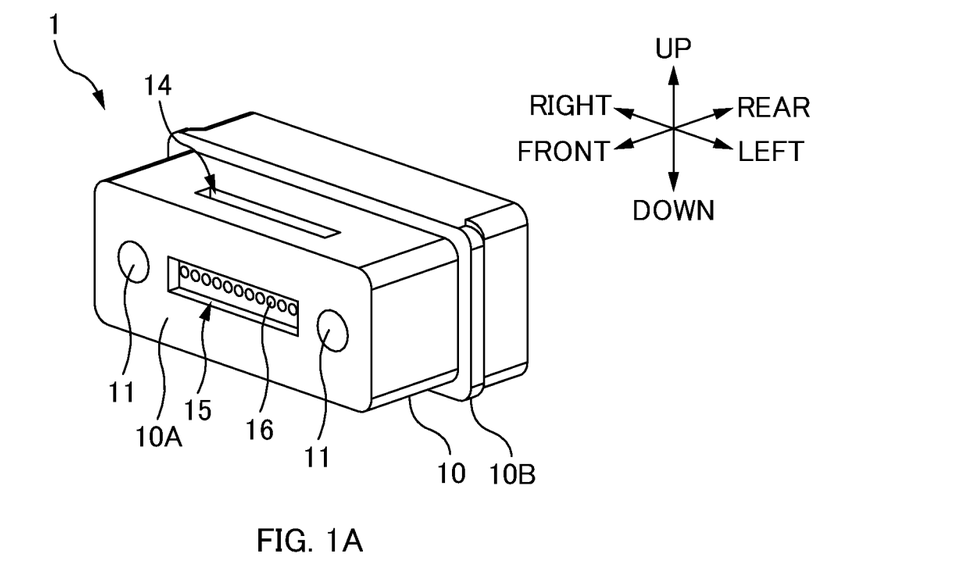
FIG. 1A and FIG. 1B are overall perspective views of a ferrule 1 according to one or more embodiments of the present invention.
Figure 1B:
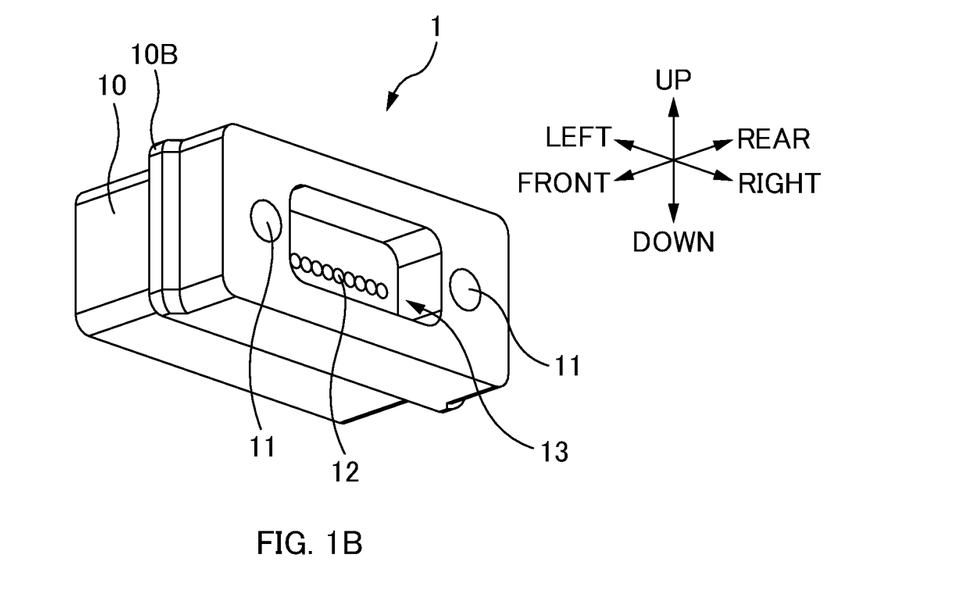
Figure 2:
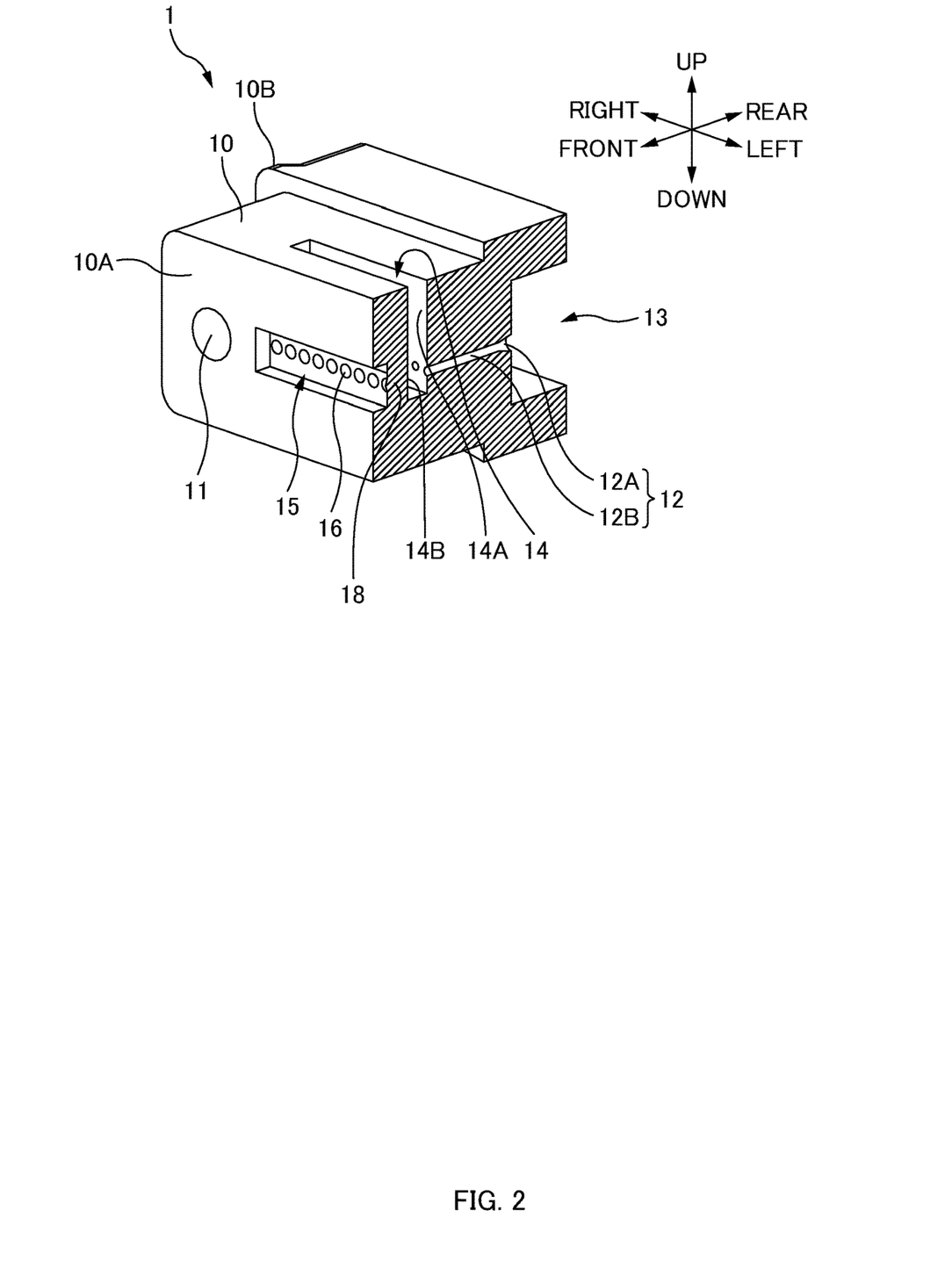
FIG. 2 is a cutaway perspective view of the ferrule 1 according to one or more embodiments of the present invention.

FIG. 1A and FIG. 1B are overall perspective views of a ferrule 1 according to one or more embodiments of the present invention. FIG. 2 is a cutaway perspective view of the ferrule 1 according to one or more embodiments of the present invention.

The following description defines respective directions as illustrated in the drawings. That is, the direction of an optical fiber hole 12 is defined as a "front-rear direction". A coupling end surface 10A side of the ferrule 1 is defined as the "front" and the other side as the "rear." The thickness direction of the ferrule 1 is defined as an "up-down direction" and a side of an opening from which an adhesive (refractive index-matching material) is filled in an adhesive-filling section 14 is defined as the "up" and the other side as the "down." A direction perpendicular to the front-rear direction and the up-down direction is defined as the "right-left direction." A width direction of the ferrule 1 is defined as the "right-left direction." A direction that two guide pin holes 11 are arranged is defined as the "right-left direction." A direction that the plurality of optical fiber holes 12 is arranged is defined as the "right-left direction." That is, a direction that a plurality of optical fibers 3 constituting an optical fiber ribbon (see reference numeral 4 in FIG. 8) mounted to the ferrule 1 are arranged is defined as the "right-left direction." In this right-left direction, the right side when the front is viewed from the rear is defined as the "right" and the other side as the "left."

First, the following describes differences between the ferrule 1 according to one or more embodiments of the present invention and an ordinary MT ferrule (an optical connector specified by JIS C5981).

In the ordinary MT ferrule, optical fiber end surfaces are exposed from a ferrule end surface. The ferrule end surfaces are caused to abut onto one another to physically couple the optical fiber end surfaces, thus optically coupling the mutual optical fibers.

In contrast to this, the optical fiber end surfaces are not exposed from the ferrule end surface 10A of the ferrule 1 according to one or more embodiments of the present invention. With the ferrule 1 of one or more embodiments, lens sections 16 are disposed in a recess site 15 of the ferrule end surface 10A, and an optical signal is input to/output from the lens sections 16. That is, the ferrule 1 of one or more embodiments has no physical contact between the optical fiber end surfaces. This features high durability, not causing deterioration even when the attachment and removal are repeatedly performed.

The ferrule 1 is a member to hold the end portions of the optical fibers 3 (see FIG. 3A) to transmit the optical signals. The end surface 10A (the ferrule end surface 10A) on the front side of a body portion 10 of the ferrule 1 is a coupling end surface coupled to a ferrule on the other side. A flange part 10B, which protrudes outside from the outer peripheral surface of the body portion 10, is formed on the rear side of the body portion 10. The body portion 10 including the ferrule end surface 10A and the flange part 10B are integrally molded with a resin (for example, a transparent resin) that can transmit the optical signal. The end portions of the plurality of optical fibers 3 are held in the inside of this body portion 10.

The body portion 10 includes the guide pin holes 11, the optical fiber holes 12, a boot hole 13, the adhesive-filling section 14, the recess site 15, the lens sections 16, and a light transmitting part 18.

The guide pin hole 11 is a hole through which a guide pin (see reference numeral 22 in FIG. 8) is inserted. Inserting the guide pins into the guide pin holes 11 matches the positions of the mutual ferrules 1. The guide pin holes 11 penetrate the body portion 10 in the front-rear direction. On the ferrule end surface 10A, the two guide pin holes 11 are open. The two guide pin holes 11 are formed spaced in the right-left direction so as to sandwich the plurality of optical fiber holes 12 laterally. The boot hole 13, the recess site 15, the lens sections 16, and the light transmitting part 18 are also disposed between the two guide pin holes 11 in addition to the optical fiber holes 12.

The optical fiber holes 12 are holes through which the optical fibers 3 are inserted. The optical fiber hole 12 is a hole to position the optical fiber 3. The optical fiber holes 12 penetrate between the boot hole 13 and the adhesive-filling section 14. A bare fiber formed by removing a coat from an optical fiber is to be inserted into the optical fiber hole 12. The optical fiber holes 12 are parallel to the front-rear direction, and the plurality of optical fiber holes 12 are arranged side by side in the right-left direction. That is, the plurality of optical fiber holes 12 parallel to one another are arranged in the right-left direction. The optical fiber holes 12 each include a tapered part 12A and a fiber fixing part 12B.

The tapered part 12A is disposed at the rear end part of the optical fiber hole 12 and has a tapered shape expanding to the rear side. Disposing such tapered part 12A facilities inserting the optical fiber 3 into the optical fiber hole 12.

The fiber fixing part 12B is disposed on the front side with respect to the tapered part 12A and has a size (a diameter) approximately identical to the diameter of the optical fiber 3. This ensures positioning the optical fiber 3 inserted into the optical fiber hole 12.

The boot hole 13 is disposed on the end surface on the rear side of the ferrule 1. The boot hole 13 is a hole to house and fix a boot (see reference numeral 26 in FIG. 3A) mounted to the optical fibers 3.

The adhesive-filling section 14 is a hollow portion or slot from which the adhesive is filled. The adhesive-filling section 14 forms the hollow that is long in the right-left direction (longer than a length of the plurality of optical fiber holes 12 and lens sections 16 which are arranged in the right-left direction). The adhesive-filling section 14 opens to the top surface of the body portion 10 of the ferrule 1. The adhesive-filling section 14 has the opening also elongated in the right-left direction (longer than a length of plurality of optical fiber holes 12 and lens sections 16 which are arranged in the right-left direction) on the top surface of the body portion 10 of the ferrule 1. With one or more embodiments of the present invention, the adhesive-filling section 14 is to be filled with an optical adhesive (a second adhesive 5B) that also functions as a refractive index-matching material (described later).

The adhesive-filling section 14 has an optical fiber hole opening surface 14A and an abutting surface 14B.

The optical fiber hole opening surface 14A is the inner wall on the rear side of the adhesive-filling section 14. On the optical fiber hole opening surface 14A, the plurality of optical fiber holes 12 are open and arranged in the right-left direction.

The abutting surface 14B is the inner wall on the front side of the adhesive-filling section 14 and is an opposed surface opposed to the optical fiber hole opening surface 14A. The abutting surface 14B is opposed to the openings of the optical fiber holes 12 on the optical fiber hole opening surface 14A and is a surface onto which the end surfaces of the optical fibers 3 abut.

The recess site 15 is a site recessed to the ferrule end surface 10A. The recess site 15 is disposed between the two guide pin holes 11 on the ferrule end surface 10A. The recess site 15 is formed into a rectangular shape elongated in the right-left direction so as to correspond to the plurality of optical fiber holes 12.

The lens sections 16 are disposed on the bottom surface (the surface to the rear side) of the recess site 15. The lens sections 16 are disposed corresponding to the plurality of respective optical fibers 3 (in other words, the plurality of optical fiber holes 12). The optical signal is input to and output from the optical fibers 3 via the lens sections 16. The lens section 16 is, for example, formed to function as a collimating lens. Inputting and outputting the optical signal whose diameter has been enlarged by the lens section 16 ensures reducing an influence from, for example, dust in an optical path, thereby ensuring suppressing the transmission loss of the optical signal.

The light transmitting part 18 is a site (a site forming the optical path) that transmits the optical signals between the ferrule end surface 10A (in detail, the lens sections 16 in the recess site 15 of the ferrule end surface 10A) and the abutting surface 14B of the adhesive-filling section 14. The body portion 10 of one or more embodiments of the present invention is integrally molded with the resin that transmits the optical signals. Meanwhile, it is only necessary that at least the site (the light transmitting part 18) where the optical path is formed can transmit the optical signals, and a site other than this site may be made of another material (a material not transmitting the optical signals).

<Adhesive>

Figure 3A:
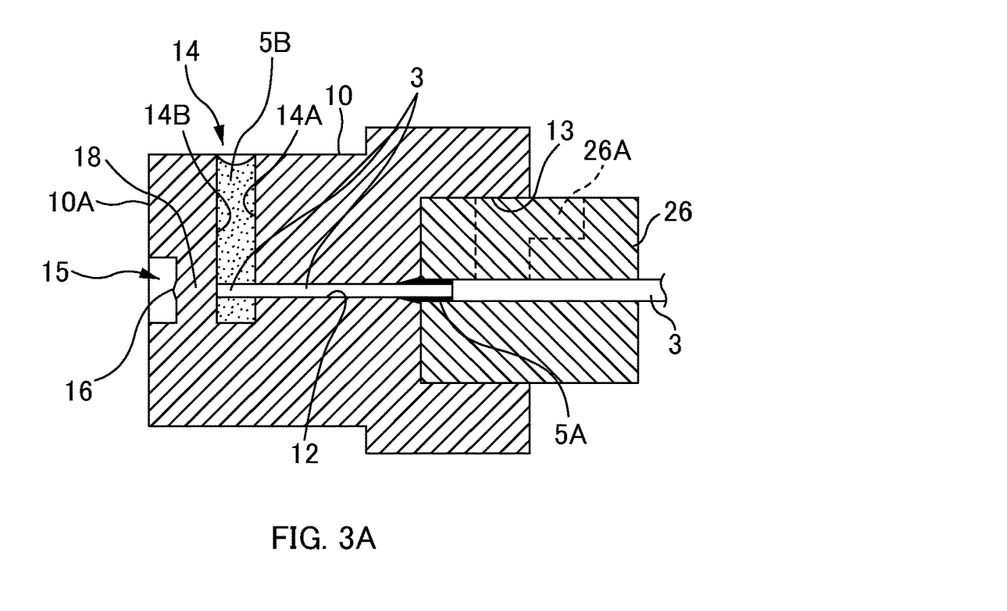
FIG. 3A is a cross-sectional view of a fiber-attached ferrule according to one or more embodiments of the present invention.
Figure 3B:
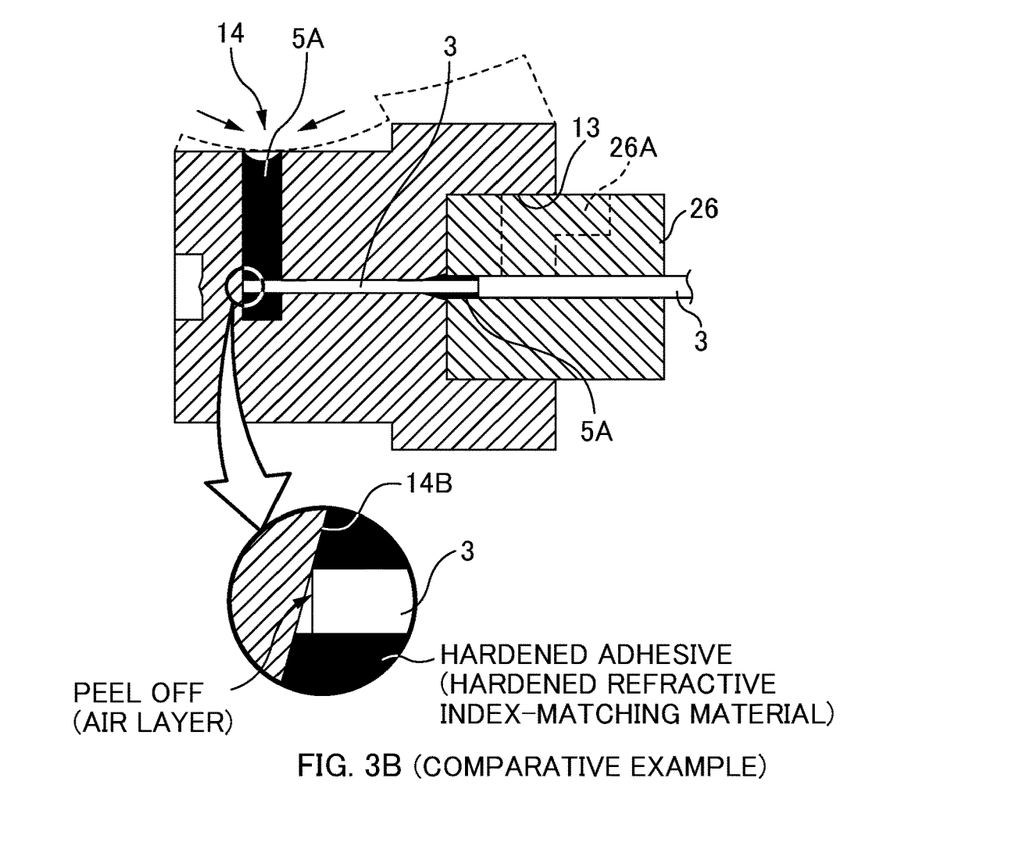
FIG. 3B is a cross-sectional view of a comparative example.

FIG. 3A is a cross-sectional view of a fiber-attached ferrule according to one or more embodiments of the present invention. FIG. 3B is a cross-sectional view of a comparative example.

An adhesive-filling section 26A is provided in a boot 26 (refer to dotted lines in FIG. 3A and FIG. 3B). The adhesive-filling section 26A of the boot 26 is filled with a hardening adhesive (for example, an ultraviolet cure adhesive, a thermosetting adhesive and the like). The adhesive (the first adhesive 5A) filled in the adhesive-filling section 26A is an adhesive to fix the optical fibers 3 passed through the optical fiber holes 12 in the optical fiber holes 12. When the first adhesive 5A is filled, the first adhesive 5A permeates between the boot 26 and the optical fibers 3, between the boot 26 and the ferrule 1 (inner wall surface of the boot hole 13), and between the optical fiber holes 12 and the optical fibers 3. When the permeated first adhesive 5A is hardened, these members are fixed with the first adhesive 5A, the optical fibers 3 are fixed in the optical fiber holes 12, and thus the optical fibers 3 are fixed in respect to the ferrule 1. The optical fibers 3 may be directly fixed in the optical fiber holes 12 (ferrule 1) by being adhered to the optical fiber holes 12, or may be indirectly fixed in the optical fiber holes 12 (ferrule 1) by the boot 26 being adhered to the ferrule 1 and the optical fibers 3 being adhered to the boot 26. As a result, even when the optical fibers 3 are pulled from the ferrule 1, the optical fibers 3 can be retained in the ferrule 1. In other words, the first adhesive 5A has a sufficient mechanical characteristic to retain the optical fibers 3 in the ferrule 1. Thus, the first adhesive 5A is a relatively hard adhesive when hardened.

As described before, the ferrule 1 includes the adhesive-filling section 14. When the adhesive is filled in the adhesive-filling section 14, the adhesive is filled around the end portions of the optical fibers 3 that protrude from the optical fiber hole opening surface 14A and the adhesive permeates in a gap between the end surfaces of the optical fibers 3 and the abutting surface 14B. When the adhesive that functions as the refractive index-matching material enters in the gap between the end surfaces of the optical fibers 3 and the abutting surface 14B, transmission loss of optical signals is suppressed. As described above, the adhesive that is filled in the adhesive-filling section 14 is an optical adhesive having an optical characteristic as a refractive index-matching material.

A hardening adhesive (for example, an ultraviolet cure adhesive and a thermosetting adhesive) is filled in the adhesive-filling section 14. When the adhesive-filling section 14 is open to the top surface of the ferrule 1, in the case where the hardened adhesive contracts, the ferrule 1 deforms such that the optical fiber opening surface 14A becomes close to the abutting surface 14B on the upper side (the opening side of the adhesive-filling section 14) of the ferrule 1. However, since the ferrule 1 has a bottom wall, the ferrule 1 does not deform on the lower side of the ferrule 1. Consequently, as indicated by the dotted line in FIG. 3B, the ferrule 1 deforms so as to warp. A cause of contraction of the adhesive includes, for example, a high temperature, high humidity environment and the hardening of the adhesive. This kind of deformation of the ferrule 1 easily occurs the deeper the adhesive-filling section 14 becomes. Specifically, in the case that the depth of the adhesive-filling section 14 (size in up-down direction) is equal to or greater than half the thickness of the body portion 10 of the ferrule 1 (size in the up-down direction), deformation of the ferrule 1 shown in FIG. 3B easily occurs.

As shown in FIG. 3B, in the comparative example, the adhesive that fills the adhesive-filling section 14 of the ferrule 1 is the same first adhesive 5A that is filled in the adhesive-filling section 26A of the boot 26. As described above, this first adhesive 5A is an adhesive that has sufficient strength to retain the optical fibers 3 in the ferrule 1, and when hardened is a relatively hard adhesive. Thus, as indicated by the dotted line in FIG. 3B, in the case where the ferrule 1 deforms so as to warp, the end surfaces of the optical fibers 3 peel off from the abutting surface 14B. Consequently, a peeling layer (an air layer) is formed between the end surfaces of the optical fibers 3 and the abutting surface 14B, possibly resulting in increase in transmission loss. The ordinary MT ferrule (the optical connector specified by JIS C5981) has the optical fiber end surfaces exposed from the ferrule end surface. In the MT ferrule, the optical fiber end surfaces are not caused to abut onto the inner wall (the abutting surface 14B) of the adhesive-filling section 14 like one or more embodiments of the present invention. Therefore, supposing that the adhesive in the adhesive-filling section 14 contracts and causes the ferrule to deform so as to warp, peeling off between the optical fiber end surfaces and the abutting surface 14B does not occur. In view of this, peeling off of the optical fiber end surfaces is a matter specific to the structure like the comparative example and one or more embodiments where the optical fiber end surfaces are caused to abut onto the inner wall of the adhesive-filling section 14 (the abutting surface 14B).

In one or more embodiments of the present invention, as shown in FIG. 3A, the adhesive that is filled in the adhesive-filling section 14 of the ferrule 1 is a second adhesive 5B that is different from the first adhesive 5A filled in the adhesive-filling section 26A of the boot 26. The second adhesive 5B is an adhesive that has a softer property compared to the first adhesive 5A. In this way, the second adhesive 5B has a characteristic such as to suppress deformation of the ferrule 1, and suppress the optical fiber end surfaces from peeling off the abutting surface 14B. In other words, because the second adhesive 5B is a relatively soft adhesive, the ferrule 1 does not easily deform due to the contraction of the adhesive in the comparative example, and increase in transmission loss can be suppressed. Supposing that the ferrule 1 deforms, when the relatively soft second adhesive 5B deforms, because a state in which the liquid refractive index-matching material has entered a gap between the optical fiber end surfaces and the abutting surface 14B can be maintained, the increase in transmission loss can be suppressed. Thus, one or more embodiments of the present invention can synergistically obtain the effect of suppressing transmission loss.

The second adhesive 5B has a lower hardness than the first adhesive 5A (is softer than the first adhesive 5A). Specifically, the first adhesive 5A after hardening has a shore hardness D of 80 to 85, whereas the second adhesive 5B after the hardening has a shore hardness D of equal to or smaller than 50. A fiber-attached ferrule 1 manufactured using the second adhesive 5B with the shore hardness D of equal to or smaller than 50 is environmentally tested by making the temperature change in order of −40° C., 25° C., 75° C., and the increased amount of loss of the optical fibers during environmental testing are measured. When evaluation based on the increased amount of loss is carried out, a maximum increased amount of loss of the increased amount of loss of the plurality of the optical fibers of the optical fiber ribbon is 1.0 dB in the comparative example, whereas is equal to or smaller than 0.3 dB in one or more embodiments. In the comparative example, the increased amount of loss in most optical fibers exceeded 0.3 dB. That is, in the case where optical fibers with the increased amount of loss equal to or greater than 0.3 dB is evaluated as "poor", in the comparative example, almost all optical fibers are evaluated as "poor", whereas no optical fibers were evaluated as "poor" in one or more embodiments.

By the way, the second adhesive 5B is adjusted such that a difference in refractive index from the optical fiber 3 decreases due to reduction in Fresnel reflection. On the contrary, the first adhesive 5A does not have to be an optical adhesive like the second adhesive 5B. Thus, the first adhesive 5A may have lower light transmittance than the second adhesive 5B, and may have a greater difference in refractive index with the optical fibers 3 than the second adhesive 5B. In this way, by making the second adhesive 5B different from the first adhesive 5A, the selection of freedom of the first adhesive 5A and the second adhesive 5B can be increased. The difference in refractive index between the second adhesive 5B to be the liquid refractive index-matching material and the optical fiber 3 is appropriately within 0.1 and more appropriately within 0.05. On the other hand, the first adhesive 5A may be allowed to have a difference in refractive index with the optical fiber 3 to be greater than 0.1.

<Method of Manufacturing Fiber-Attached Ferrule 1>

Figure 4:
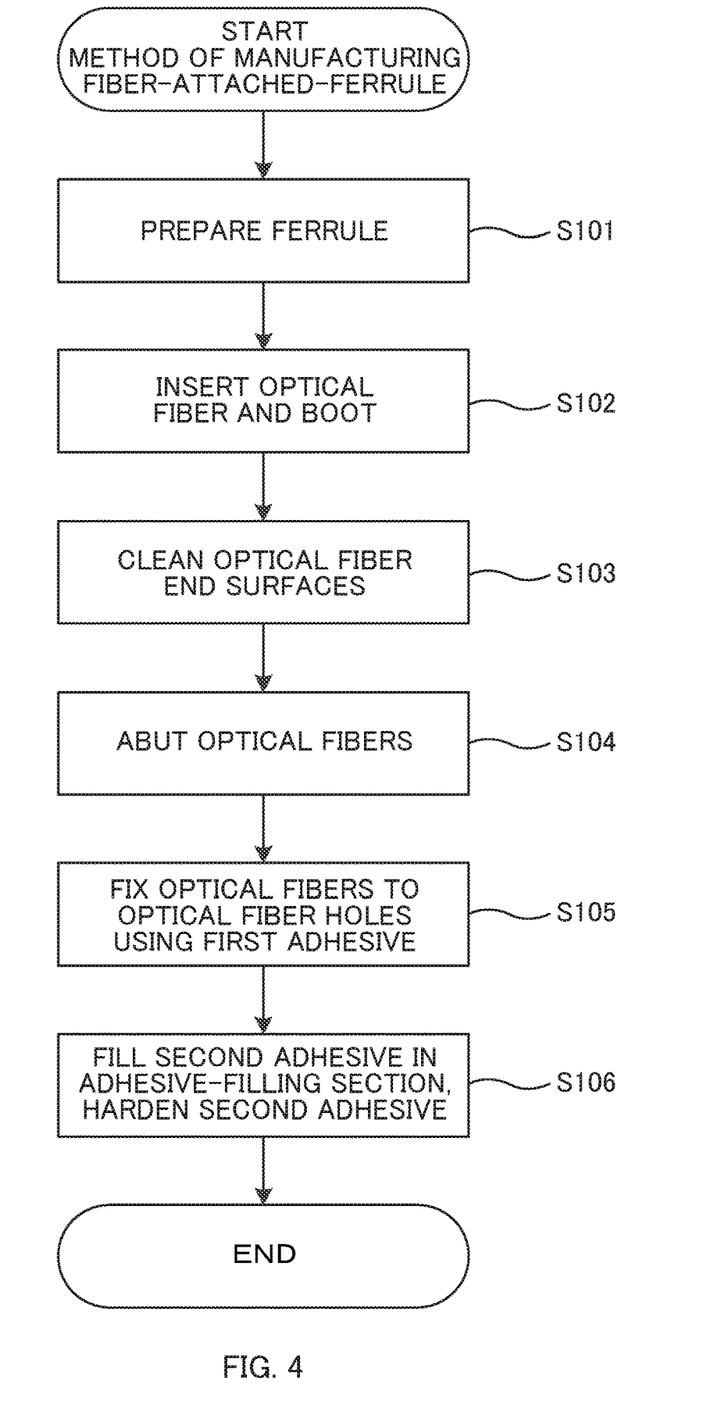
FIG. 4 is a flowchart of a manufacturing method (an assembly procedure) of the fiber-attached ferrule 1 according to one or more embodiments of the present invention.

FIG. 4 is a flowchart of a manufacturing method (an assembly procedure) of the fiber-attached ferrule 1.

First, an operator prepares the ferrule 1 of one or more embodiments of the present invention (S101). The operator inserts the respective optical fibers 3 of the optical fiber ribbon, which is preliminarily inserted into the boot 26, into the optical fiber holes 12 on the ferrule 1, and inserts the boot 26 into the boot hole 13 of the ferrule 1 (S102). Then, the optical fiber end surfaces are protruded from the optical fiber hole opening surface 14A. Note that, at this phase, the optical fiber end surfaces do not abut onto the abutting surface 14B of the adhesive-filling section 14. This is because that, when the optical fibers 3 are passed through the optical fiber holes 12, dust and the like possibly attach to the optical fiber end surfaces.

Next, the operator cleans the optical fiber end surfaces protruded from the optical fiber hole opening surface 14A of the adhesive-filling section 14 (S103). For example, the operator sprays air from the opening on the adhesive-filling section 14 to blow off the dust on the optical fiber end surfaces. This allows removing the dust on the optical fiber end surfaces attached during the insertion to the optical fiber holes 12. To thus remove the dust on the optical fiber end surfaces, the second adhesive 5B is filled in the adhesive-filling section 14 after the insertion of the optical fibers 3, not preliminary filled before the insertion of the optical fibers 3.

After cleaning the optical fiber end surfaces, the operator slides the optical fibers 3 (the optical fiber ribbon) forward with respect to the boot 26 to cause the optical fiber end surfaces to abut onto the abutting surface 14B of the adhesive-filling section 14 (S104). When the optical fiber end surfaces are abutted to the abutting surface 14B, all regions of the optical fiber end surfaces do not contact the abutting surface 14B. In the case where there is a variation in the length of the plurality of the optical fibers 3, even if a certain part of the optical fiber end surfaces contact the abutting surface 14B, other optical fiber end surfaces may be close to but not in contact with the abutting surface 14B. Thus, at this phase, an air layer is present between the optical fiber end surface and the abutting surface 14B.

Next, the operator fixes the optical fibers 3 to the ferrule 1 using the first adhesive 5A with the optical fiber end surfaces abutted to the abutting surface 14B of the adhesive-filling section 14 (with the optical fiber end surfaces placed close to the abutting surface 14B) (S105). At this time, the operator fills an adhesive-filling section 26A (see the dotted line in FIG. 3A) disposed to the boot 26 with the thermosetting first adhesive 5A to permeate the adhesive between the optical fiber hole 12 and the optical fibers 3. The adhesive-filling section 26A (see the dotted line in FIG. 3A) of the boot 26 may be filled with the first adhesive 5A to permeate the first adhesive 5A between the boot 26 and the optical fiber 3 and between the boot 26 and the ferrule 1 (the inner wall surface of the boot hole 13). After the thermosetting first adhesive 5A is permeated into the respective portions, the operator heats and hardens the first adhesive 5A to thus bond and fix the optical fibers 3 to the ferrule 1. A method for applying the first adhesive 5A is not limited to the method of using the adhesive-filling section 26A. The first adhesive 5A does not have to be a thermosetting adhesive.

Next, the operator fills the adhesive-filling section 14 with the second adhesive 5B and hardens the second adhesive 5B (S106). The filling of the second adhesive 5B in the adhesive-filling section 14 permeates the second adhesive 5B in a gap between the end surfaces of the optical fibers 3 and the abutting surface 14B. A capillarity of the second adhesive 5B permeates the second adhesive 5B between the optical fiber end surfaces and the abutting surface 14B; thus, an air bubble is less likely to remain between the optical fiber end surfaces and the abutting surface 14B. After the thermosetting second adhesive 5B is filled in the adhesive-filling section 14, the operator heats and hardens the second adhesive 5B. The second adhesive 5B does not have to be a thermosetting adhesive, and may be an ultraviolet cure adhesive, for example.

The completion of the hardening of the second adhesive 5B filled in the adhesive-filling section 14 completes the fiber-attached ferrule 1 of one or more embodiments of the present invention.

With the above-described method of manufacturing the fiber-attached ferrule 1, after temporarily fixing the optical fibers 3 to the ferrule 1 in S105, the operator fills the second adhesive 5B in the adhesive-filling section 14 in S106, and performs work to harden the second adhesive 5B. Thus, the work to fill the second adhesive 5B in the adhesive-filling section 14 and the work to harden the second adhesive 5B becomes easy. On the contrary, supposing that the optical fibers 3 are not fixed to the ferrule 1 at the time of the work of S106, the work of maintaining the optical fiber end surfaces to be abutted to the abutting surface 14B (the optical fiber end surfaces being placed close to the abutting surface 14B) and filling the second adhesive 5B in the adhesive-filling section 14 becomes difficult.

Further, with the above-described method of manufacturing the fiber-attached ferrule 1, after the first adhesive 5A is hardened in S105, the operator fills the second adhesive 5B in the adhesive-filling section 14 in S106, thus mixing of the first adhesive 5A and the second adhesive 5B can be prevented. Supposing that the first adhesive 5A and the second adhesive 5B are filled at the same time, the first adhesive 5A and the second adhesive 5B permeate and mix together in the optical fiber holes 12, and as a result there is a possibility that the adhesive strength between the optical fibers 3 and the optical fiber holes 12 decreases.

Further, with the above-described method of manufacturing the fiber-attached ferrule 1, the second adhesive 5B that is softer than the first adhesive 5A is filled in the adhesive-filling section 14. Thus, the deformation of the ferrule 1 due to hardening of the second adhesive 5B can be suppressed, thereby the transmission loss can be suppressed. Additionally, supposing that the ferrule 1 deforms, when the relatively soft second adhesive 5B deforms, the state in which the second adhesive 5B is in the gap between the optical fiber end surfaces and the abutting surface 14B can be maintained, thus increase of the transmission loss can be suppressed. Thus, the effect of suppressing the transmission loss can be synergistically obtained.

<Modification>

When the adhesive-filling section 14 is filled with the second adhesive 5B (S106), the plurality of end surfaces of the optical fibers 3 are caused to abut onto the abutting surface 14B. Accordingly, the plurality of optical fibers 3 serve as barriers inside of the adhesive-filling section 14. The second adhesive 5B is likely to accumulate on the upper portions of the plurality of optical fibers 3. Consequently, the second adhesive 5B accumulated on the upper portions of the plurality of optical fibers 3 blocks the adhesive-filling section 14. This makes it difficult for the second adhesive 5B to reach the lower side of the adhesive-filling section 14 and an air bubble is possibly formed at the bottom of the adhesive-filling section 14. Thus, a ventilation hole may be formed between the bottom surface of the adhesive-filling section 14 and the lower surface of the ferrule 1.

Figure 5A:
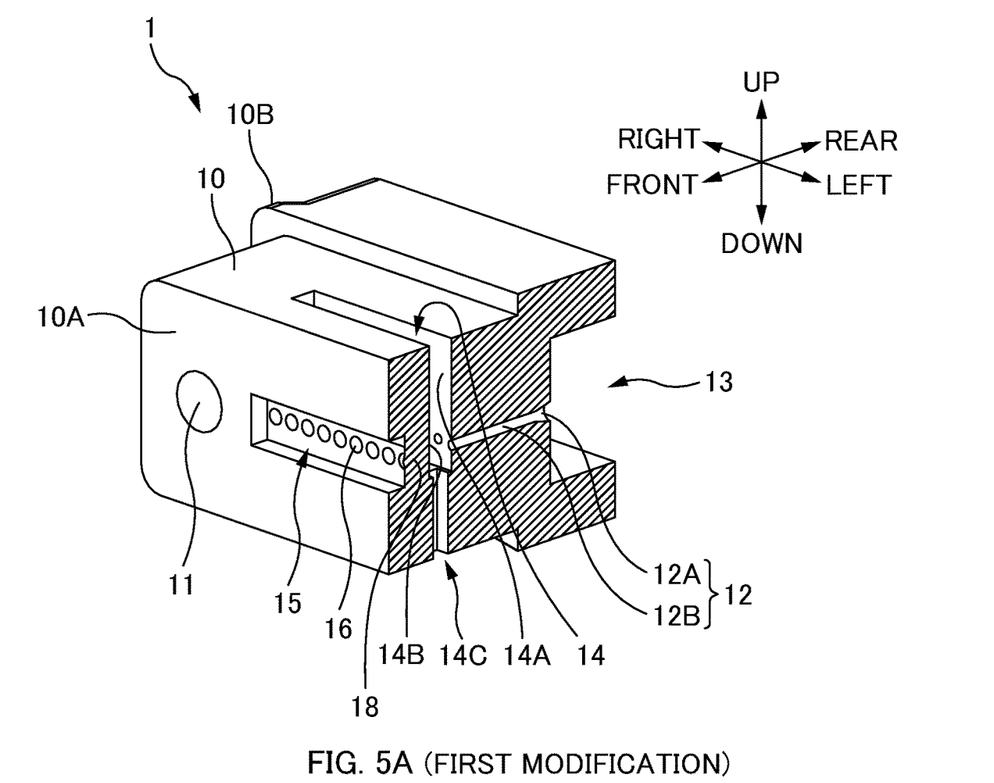
FIG. 5A is a cutaway perspective view of the ferrule 1 of a first modification of one or more embodiments of the present invention.
Figure 5B:
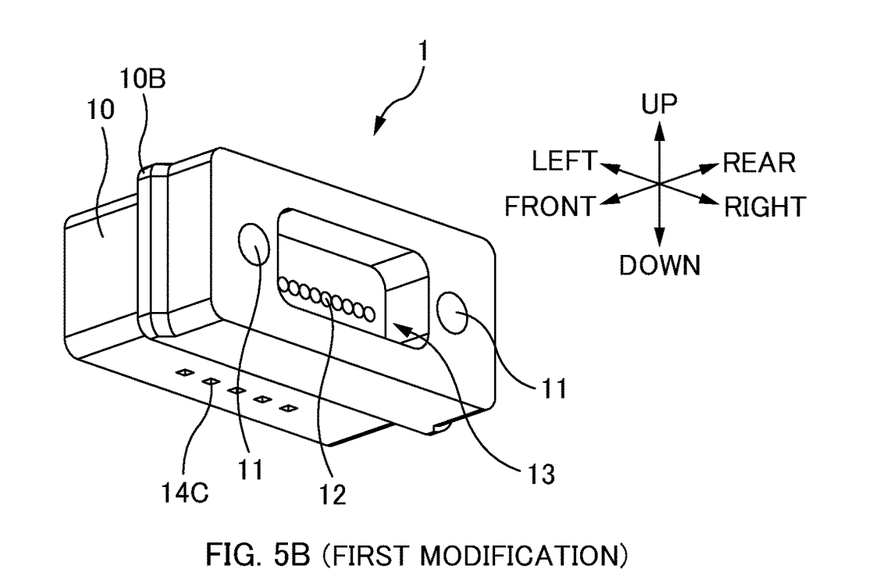
FIG. 5B is an overall perspective view of the ferrule 1 of the first modification of one or more embodiments of the present invention.

FIG. 5A is a cutaway perspective view of the ferrule 1 of a first modification of one or more embodiments of the present invention. FIG. 5B is an overall perspective view of the ferrule 1 of the first modification of one or more embodiments of the present invention.

The ferrule 1 of this first modification includes ventilation holes 14C to the bottom of the adhesive-filling section 14. The second adhesive 5B has a physical property to the extent of not causing a leakage from an opening of the adhesive-filling section 14, thus when the openings of the ventilation holes 14C are configured smaller than the opening on the upper side of the adhesive-filling section 14, the second adhesive 5B does not leak from the ventilation holes 14C. In the case where the ventilation holes 14C are disposed to the bottom surface of the adhesive-filling section 14, an air bubble is less likely to be formed to the bottom of the adhesive-filling section 14. Additionally, an effect is obtained in which the work time taken for filling the adhesive-filling section 14 with the second adhesive 5B can be shortened.

In the modification illustrated in FIG. 5A and FIG. 5B, although the plurality of small ventilation holes 14C are arranged in the right-left direction, the ventilation hole 14C may be one or may be an opening elongated in the right-left direction. Further, the ventilation holes 14C may be formed to not open from the lower surface of the ferrule 1, but to open from side surfaces (side surfaces in the left-right direction) of the ferrule 1.

Figure 6A:
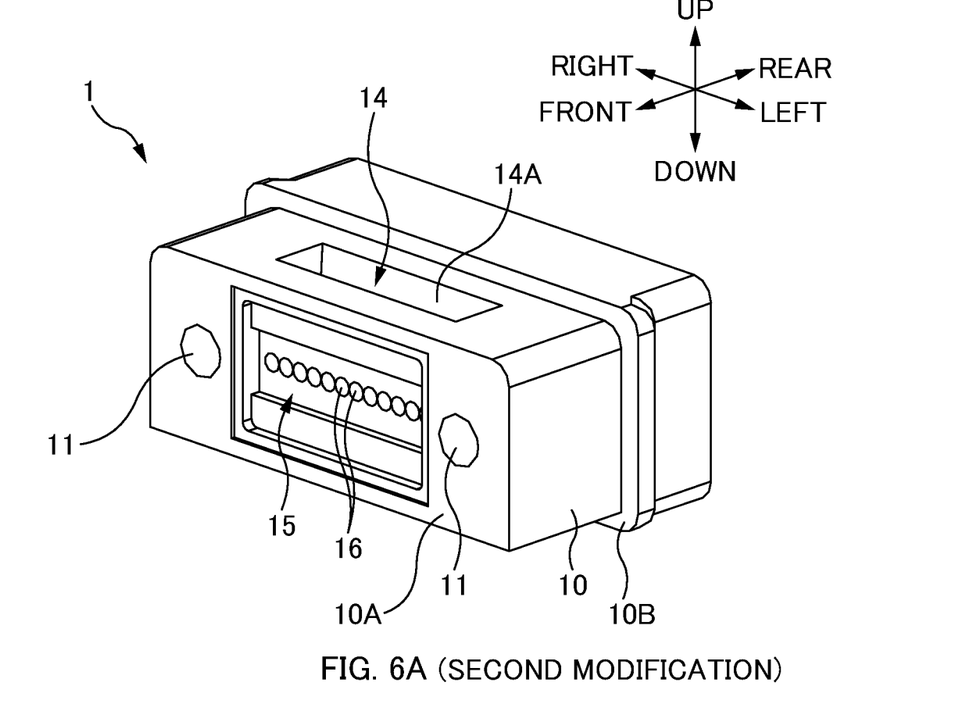
FIG. 6A and FIG. 6B are overall perspective views of a ferrule 1 of a second modification of one or more embodiments of the present invention.
Figure 6B:
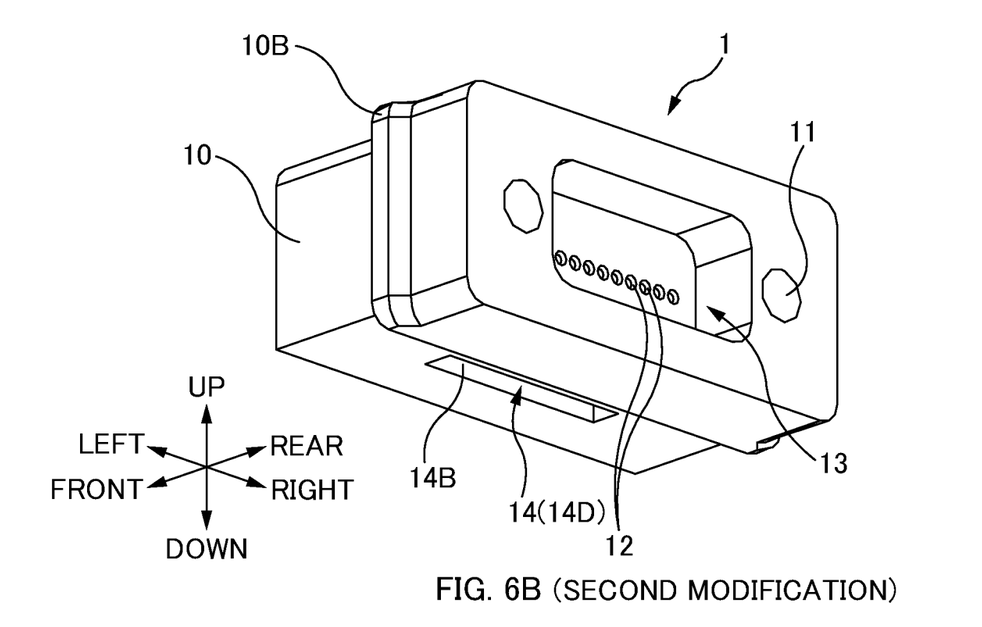
Figure 7A:
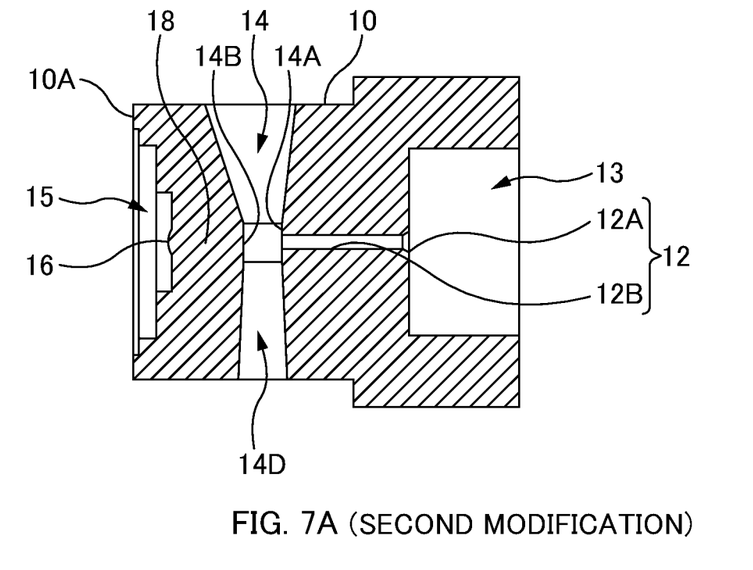
FIG. 7A is a cross-sectional view of a ferrule 1 of a second modification of one or more embodiments of the present invention.
Figure 7B:
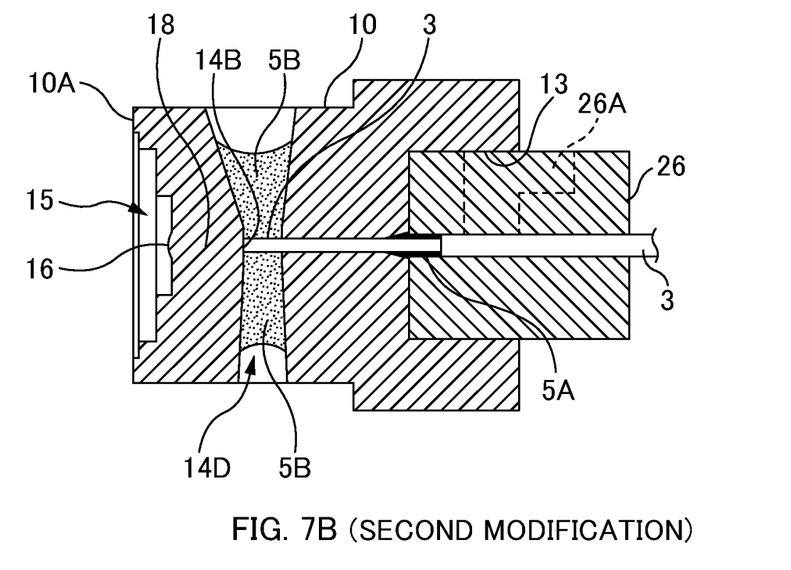
FIG. 7B is a cross-sectional view of a fiber-attached ferrule 1 of a second modification of one or more embodiments of the present invention.

FIG. 6A and FIG. 6B are overall perspective views of a ferrule 1 of a second modification of one or more embodiments of the present invention. FIG. 7A is a cross-sectional view of a ferrule 1 of a second modification of one or more embodiments of the present invention. FIG. 7B is a cross-sectional view of a fiber-attached ferrule 1 of a second modification of one or more embodiments of the present invention.

In this second modification, a lower side opening 14D is formed in a bottom of the adhesive-filling section 14. The lower side opening 14D is a section that opens on a lower surface of the body portion 10 of the ferrule 1. The lower side opening 14D is open as a long and narrow rectangular shape in the right-left direction in the lower surface of the body portion 10 of the ferrule 1. In this way, the adhesive-filling section 14 of the second modification penetrates through the ferrule 1 in the up-down direction (thickness direction of the ferrule 1). Due to surface tension of the second adhesive 5B, the second adhesive 5B is prevented from leaking to the lower side from the opening of the lower side opening 14D. In other words, the size of the lower side opening 14D is a size such that the second adhesive 5B does not leak to the lower side of the lower side opening 14D due to the surface tension of the second adhesive 5B.

As already described above, in the case where the adhesive-filling section 14 is open only to the upper side as in the comparative example (refer to FIG. 3B), when the adhesive filled in the adhesive-filling section 14 contracts, the ferrule 1 deforms such that the optical fiber hole opening surface 14A and the abutting surface 14B come close in the upper side of the open ferrule 1, but the ferrule 1 does not deform in the lower side of the ferrule 1 as there is a bottom wall of the ferrule 1. As a result, the ferrule 1 deforms so as to warp as shown by the dotted lines in FIG. 3B.

On the contrary, in the second modification, the lower side opening 14D is open in the lower surface of the ferrule 1, and a bottom wall of the ferrule 1 is not provided to the lower side opening 14D. Thus, in the second modification, when the ferrule 1 deforms such that the optical fiber hole opening surface 14A and the abutting surface 14B come close in the upper side of the ferrule 1 with the contractile force of the second adhesive 5B, the ferrule 1 can deform such that the optical fiber hole opening surface 14A and the abutting surface 14B come close also in the lower side opening 14D. Accordingly, in the second modification, even if the second adhesive 5B of the adhesive-filling section 14 contracts, contractile force of the second adhesive 5B will act to both the upper part and the lower part of the ferrule 1, and deformation of the ferrule 1 so as to warp can be further suppressed. Further, in the second modification, deformation of the ferrule 1 so as to warp can be suppressed, so that peeling off of the optical fiber end surface and the abutting surface 14B does not easily occur, and transmission loss of optical signals can be further suppressed.

In the second modification shown in FIG. 6B, the width of the lower side opening 14D in the right-left direction (a space between an inner wall to the left side and an inner wall to the right side of the lower side opening 14D) is set wider than a width of a row of the plurality of fiber holes 12 aligned in the right-left direction (a space between an optical fiber hole 12 to a leftmost end and an optical fiber hole 12 to a rightmost end: width of row of optical fiber holes). In this way, when the second adhesive 5B filled in the adhesive-filling section 14 contracts, the contractile force of the adhesive 5 acts to the ferrule 1 in both sides to the upper part and the lower part of the optical fibers 3, and so deformation of the ferrule 1 so as to warp can be suppressed. As long as the width of the lower side opening 14D in the right-left direction, however, is equal to or greater than half the width of the row of the optical fiber holes, an effect of suppressing deformation of the ferrule 1 can be achieved.

<Optical Connector>

Figure 8:
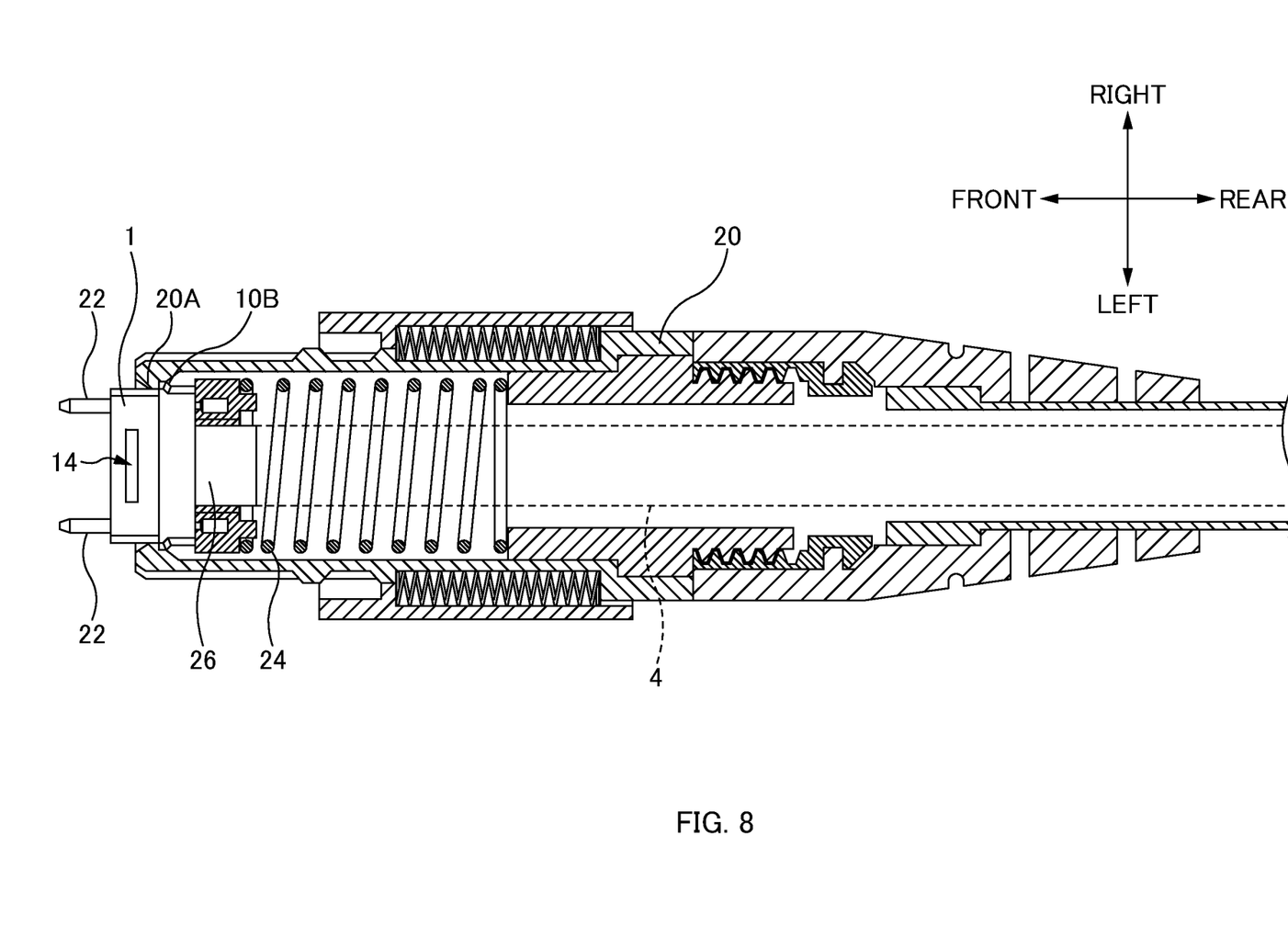
FIG. 8 is a schematic cross-sectional view of an optical connector using the ferrule 1 according to one or more embodiments of the present invention.

FIG. 8 is a schematic cross-sectional view of the optical connector using the ferrule 1 according to one or more embodiments of the present invention. As illustrated in the drawing, the ferrule 1 of one or more embodiments can be housed in a housing 20 for the optical connector for use.

The housing 20 is a member that houses the ferrule 1 to be retreatable. A protruding part 20A is formed in an internal space of the housing 20. With this protruding part 20A engaged with the flange part 10B of the ferrule 1, the ferrule 1 is biased to the front side by a repulsion force from a spring 24.

The guide pins 22 are inserted into the two guide pin holes 11 of the ferrule 1. These guide pins 22 position the ferrule 1 with respect to a ferrule 1 of the optical connector on the other side. The boot 26 is inserted into the boot hole 13 of the ferrule 1. The boot 26 is a member whose cross-sectional surface has an approximately tubular rectangular shape. The plurality of respective optical fibers 3 of the optical fiber ribbon 4 penetrate the boot 26 in the front-rear direction. The dimensions of the boot 26 in the right-left direction and the up-down direction are approximately identical to the dimensions of the boot hole 13. The boot 26 is fitted to the boot hole 13.

Figure 9:
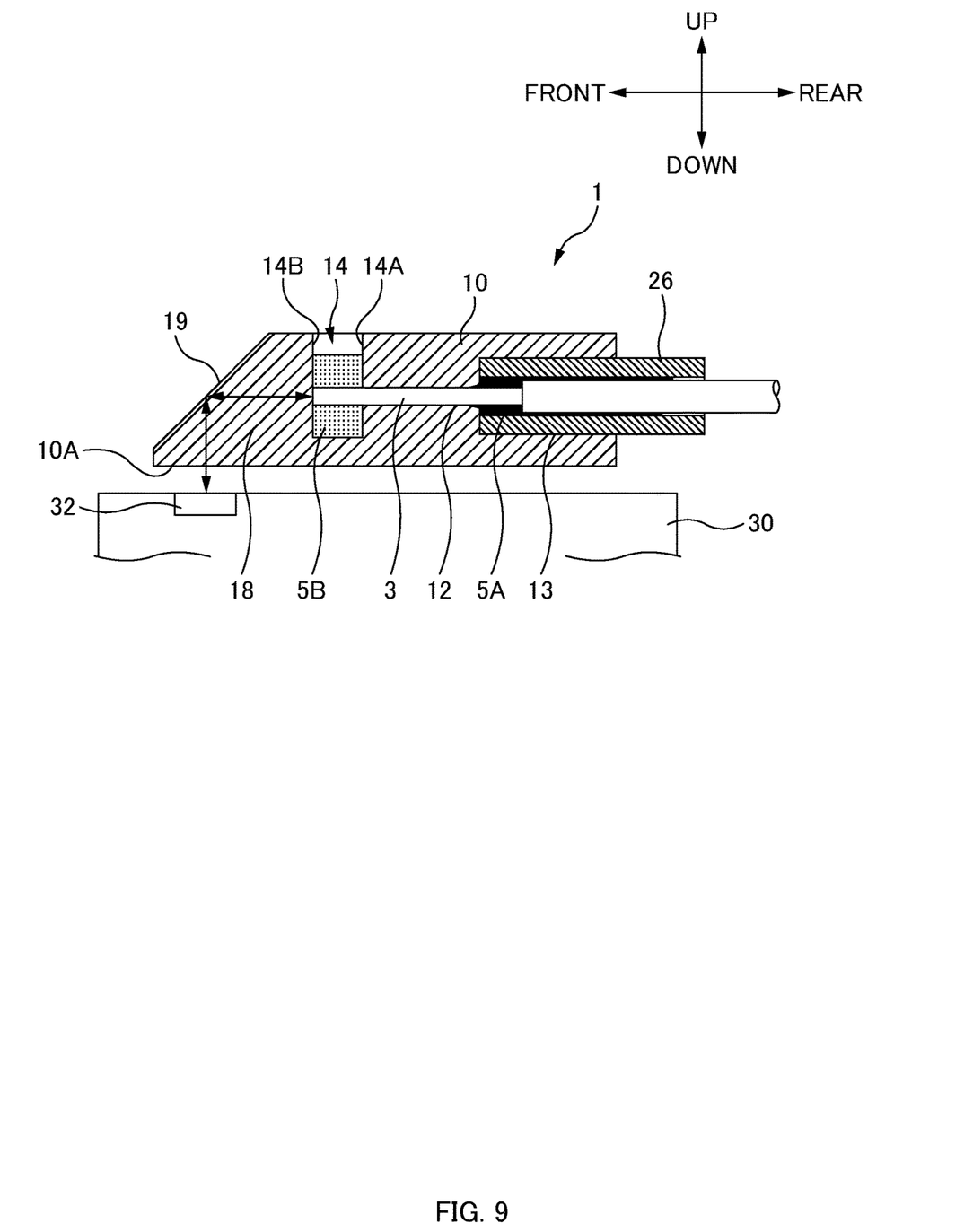
FIG. 9 is a schematic cross-sectional view of the ferrule 1 according to one or more embodiments of the present invention.

A ferrule 1 according to one or more embodiments of the present invention has a reflective section 19. The optical signal is transmitted via the reflective section 19.

FIG. 9 is a schematic cross-sectional view of the ferrule 1 according to one or more embodiments of the present invention.

The ferrule 1 of one or more embodiments is fixed on a photoelectric conversion module 30 via a holder (not illustrated). For example, a positioning pin (not illustrated) is formed on a lower surface of the ferrule 1. The positioning pin is fitted to a positioning hole (not illustrated) of the holder (not illustrated) bonded and fixed to the top surface of the photoelectric conversion module 30. Thus, the ferrule 1 is positioned with respect to the photoelectric conversion module 30. A light-emitting element such as a semiconductor laser or a light receiving element such as a photodiode is used as a light element 32 of the photoelectric conversion module 30.

A body portion 10 of the ferrule 1 of one or more embodiments is, similar to the body portion 10 of the aforementioned embodiments, integrally molded with the resin, which transmits the optical signals. In one or more embodiments, the lower surface of the body portion 10 is the ferrule end surface 10A. The ferrule 1 includes the plurality of optical fiber holes 12, which are arranged in the right-left direction (the direction vertical to the paper) and the adhesive-filling section 14. The adhesive-filling section 14 has the optical fiber hole opening surface 14A and the abutting surface 14B, which is opposed to the openings of the optical fiber holes 12 (the opposed surface opposed to the optical fiber hole opening surface 14A). In the body portion 10, the site on the front side with respect to the abutting surface 14B of the adhesive-filling section 14 is configured as the light transmitting part 18, and the light transmitting part 18 includes the reflective section 19. The reflective section 19 has an inclined surface inclined to the rear side as nearer it gets to the upper side.

When the light element 32 is the light-emitting element, the reflective section 19 reflects the light entering the ferrule end surface 10A to the end surfaces of the optical fibers 3 (transforms the light parallel to the up-down direction into the light parallel to the front-rear direction). When the light element 32 is the light receiving element, the reflective section 19 reflects the light emitted from the end surfaces of the optical fibers 3 to the light element 32 (transforms the light parallel to the front-rear direction into the light parallel to the up-down direction). Thus, the reflective section 19 reflects the light (the optical signal) to transform the optical path.

With one or more embodiments of the present invention as well, the optical fibers 3 are fixed in the optical fiber holes 12 with the first adhesive 5A, and the second adhesive 5B that is softer than the first adhesive 5A is filled in the adhesive-filling section 14. For example, also in one or more embodiments, the hardened first adhesive 5A has a shore hardness D of 80 to 85, whereas the hardened second adhesive 5B has a shore hardness D of equal to or smaller than 50. In this way, the deformation of the ferrule 1 can be reduced, thereby allowing suppressing increase of the transmission loss. Additionally, supposing that the ferrule 1 deforms, when the relatively soft second adhesive 5B deforms, since a state in which the refractive index-matching material has entered a space between the optical fiber end surfaces and the abutting surface 14B can be maintained, increase of the transmission loss can be suppressed. Thus, in one or more embodiments, the effect of suppressing the transmission loss can be synergistically obtained.

Also in one or more embodiments, the first adhesive 5A does not have to be an optical adhesive like the second adhesive 5B. Thus, the first adhesive 5A may have a lower light transmittance than the second adhesive 5B, and may have a greater difference in refractive index with the optical fibers 3 than the second adhesive 5B.

Also in one or more embodiments, ventilation holes may be formed in the adhesive-filling section 14. Further, also in one or more embodiments, a lower side opening may be formed in a bottom of the adhesive-filling section 14, and the adhesive-filling section 14 may penetrate the ferrule 1 in the up-down direction.

Further, in one or more embodiments, when manufacturing the optical-fiber-attached ferrule 1, after the operator temporarily fixes the optical fibers 3 to the ferrule 1 with the first adhesive 5A (refer to S105), the operator fills the second adhesive 5B in the adhesive-filling section 14, and hardens the second adhesive 5B. In this way, the work of filling the second adhesive 5B in the adhesive-filling section 14 and the work of hardening the second adhesive 5B become easier.

CONCLUSION

The optical-fiber-attached ferrule in some of the above embodiments has the optical fiber holes 12 (fiber holes) in which the optical fibers 3 are inserted, and the adhesive-filling section 14 that includes the optical fiber hole opening surface 14A and the abutting surface 14B (an opposing surface that opposes the opening surface of the optical fiber holes). In some of the above embodiments, the optical fibers 3 are fixed in the optical fiber holes 12 with the first adhesive 5A, and with the optical fiber end surfaces in a state close to the abutting surface 14B (abutting state), the second adhesive 5B softer than the first adhesive 5A is filled in the adhesive-filling section 14. In this way, deformation of the ferrule 1 can be suppressed, so that even if the ferrule 1 deforms, the state where the refractive index-matching material is in the space between the optical fiber end surface and the abutting surface 14B can be maintained, and thus the effect of suppressing the transmission loss can be synergistically achieved.

In some of the above embodiments, the second adhesive 5B has shore hardness D of equal to or smaller than 50. Thus, the increased amount of loss of the optical fibers can be suppressed to equal to or smaller than 0.3 dB during the predetermined environmental change.

In some of the above embodiments, the first adhesive 5A has a greater difference in refractive index with the optical fibers 3 than the second adhesive 5B, and has a lower light transmittance than the second adhesive 5B. Thus, the freedom in selecting the first adhesive 5A and the second adhesive 5B can be increased, compared to the case where the first adhesive 5A and the second adhesive 5B are the same adhesive.

In some of the above embodiments, the depth of the adhesive-filling section 14 is equal to or greater than half the thickness of the body portion 10 of the ferrule 1. In the case where the ferrule 1 is such a shape, the ferrule 1 easily deforms so as to warp due to contraction of the adhesive filled in the adhesive-filling section 14 (FIG. 3B), thus it is particularly advantageous to fill the second adhesive 5B that is softer than the first adhesive 5A in the adhesive-filling section 14 as in some of the above embodiments.

Further, in some of the above embodiments, the ferrule 1 includes a recess site 15 that is recessed in respect to the ferrule end surface 10A and a lens section 16 arranged corresponding to the optical fiber holes 12 formed in the recess site. In this way, there is no physical contact between the optical fiber end surfaces, and durability can be increased.

Further, in some of the above embodiments, the ventilation holes 14C are formed in the adhesive-filling section 14. In this way, bubbles do not easily form in the bottom of the adhesive-filling section 14 when the second adhesive 5B is filled in the adhesive-filling section 14.

Further, in some of the above embodiments, the lower side opening 14D (opening) is formed in the bottom of the adhesive-filling section 14, and the adhesive-filling section 14 penetrates through the ferrule 1. In this way, deformation such that the ferrule 1 warps can be further suppressed. In this case, the size of the lower side opening 14D is a size such that the second adhesive 5B does not leak to the lower side of the lower side opening 14D due to surface tension of the second adhesive 5B, according to one or more embodiments of the present invention. In this way, when the second adhesive 5B is filled in the adhesive-filling section 14, the second adhesive 5B can be suppressed from leaking from the lower side opening 14D.

In a method of manufacturing an optical-fiber-attached ferrule in some of the above embodiments, a step S101 of (1) preparing a ferrule that includes the optical fiber holes 12 (fiber holes) into which the optical fibers 3 are inserted, and an adhesive-filling section 14 including an optical fiber hole opening surface 14A and an abutting surface 14B (opposed surface opposed to the opening surface of the optical fiber hole); a step S105 of (2) fixing the optical fiber 3 in the optical fiber hole 12 with a first adhesive 5A; and a step S106 of (3) filling the adhesive-filling section 14 with a second adhesive 5B that is softer than the first adhesive 5A with the end surface of the optical fiber being located close to the opposed surface 14B (abutted state). In this way, deformation of the ferrule 1 can be suppressed, thus even if the ferrule 1 deforms, as the state in which the refractive index-matching material is in the space between the optical fiber end surfaces and the abutting surface 14B can be maintained, the effect of suppressing the transmission loss can be synergistically achieved.

Further, in some of the above embodiments, in a state where the optical fiber end surface is located close to the abutting surface 14D (in an abutted state), after the optical fiber 3 is fixed in the optical fiber hole 12 with the first adhesive 5A (S105), the work to fill the second adhesive 5B in the adhesive-filling section 14 is performed. In this way, the work to fill the second adhesive 5B in the adhesive-filling section 14 becomes easy. The second adhesive 5B may be filled in the adhesive-filling section 14 with the optical fiber 3 in an unfixed state to the ferrule 1. In this case, work to fill the second adhesive 5B becomes difficult, but the effect of suppressing the transmission loss can be achieved.

===Others===

Although the disclosure has been described with respect to only a limited number of embodiments, those skill in the art, having benefit of this disclosure, will appreciate that various other embodiments may be devised without departing from the scope of the present invention. Accordingly, the scope of the invention should be limited only by the attached claims.

REFERENCE SIGNS LIST 1 ferrule, 3 optical fiber,
4 optical fiber ribbon, 5A first adhesive, 5B second adhesive,
10 body portion, 10A ferrule end surface, 10B flange part,
11 guide pin hole, 12 optical fiber hole,
12A tapered part, 12B fiber fixing part,
13 boot hole, 14 adhesive-filling section,
14A optical fiber opening surface, 14B abutting surface,
14C ventilation hole, 14D lower side opening,
15 recess site, 16 lens section,
18 light transmitting part, 19 reflective section,
20 housing, 20A protruding part,
22 guide pin,
24 spring, 26 boot,
30 photoelectric conversion module, 32 light element

The invention claimed is:

1. An optical-fiber-attached ferrule comprising:
an optical fiber hole into which an optical fiber is inserted and fixed with a first adhesive; and
an adhesive-filling section comprising an opening surface and an opposed surface opposite the opening surface, wherein
the adhesive-filling section is filled with a second adhesive that is softer than the first adhesive with an end surface of the optical fiber positioned closer to the opposed surface than to the opening surface, and
a difference in refractive index with the optical fiber is greater for the first adhesive than for the second adhesive.

2. The optical-fiber-attached ferrule according to claim 1, wherein
the second adhesive has a shore hardness D equal to or smaller than 50.

3. The optical-fiber-attached ferrule according to claim 1, wherein:
a depth of the adhesive-filling section is equal to or greater than half a thickness of a ferrule body.

4. The optical-fiber-attached ferrule according to claim 1, further comprising:
a recess site recessed with respect to an end surface of the ferrule; and
a lens formed in the recess site and disposed corresponding to the optical fiber hole.

5. The optical-fiber-attached ferrule according to claim 1, wherein
a ventilation hole is formed in the adhesive-filling section.

6. The optical-fiber-attached ferrule according to claim 1, wherein
the adhesive-filling section further comprises an opening formed in a bottom of the adhesive-filling section, and
the adhesive-filling section penetrates the ferrule.

7. The optical-fiber-attached ferrule according to claim 6, wherein
the opening formed in the bottom of the adhesive-filling section prevents the second adhesive from leaking due to surface tension of the second adhesive.

8. An optical-fiber-attached ferrule comprising:
an optical fiber hole into which an optical fiber is inserted and fixed with a first adhesive; and
an adhesive-filling section comprising an opening surface and an opposed surface opposite the opening surface, wherein
the adhesive-filling section is filled with a second adhesive that is softer than the first adhesive with an end surface of the optical fiber positioned closer to the opposed surface than to the opening surface, and
light transmittance of the first adhesive is lower than light transmittance of the second adhesive.

9. The optical-fiber-attached ferrule according to claim 8, wherein
the second adhesive has a shore hardness D equal to or smaller than 50.

10. The optical-fiber-attached ferrule according to claim 8, wherein
a depth of the adhesive-filling section is equal to or greater than half a thickness of a ferrule body.

11. The optical-fiber-attached ferrule according to claim 8, further comprising:
a recess site recessed with respect to an end surface of the ferrule; and
a lens formed in the recess site and disposed corresponding to the optical fiber hole.

12. The optical-fiber-attached ferrule according to claim 8, wherein
a ventilation hole is formed in the adhesive-filling section.

13. The optical-fiber-attached ferrule according to claim 8, wherein
the adhesive-filling section further comprises an opening formed in a bottom of the adhesive-filling section, and
the adhesive-filling section penetrates the ferrule.

14. The optical-fiber-attached ferrule according to claim 13, wherein
the opening formed in the bottom of the adhesive-filling section prevents the second adhesive from leaking due to surface tension of the second adhesive.

15. A method of manufacturing an optical-fiber-attached ferrule comprising an optical fiber hole and an adhesive filling section with an opening surface and an opposed surface opposite the opening surface, the method comprising:
inserting an optical fiber in the optical fiber hole;
fixing the optical fiber in the optical fiber hole with a first adhesive;
filling the adhesive-filling section with a second adhesive that is softer than the first adhesive with the end surface of the optical fiber positioned closer to the opposed surface than to the opening surface; and
causing the second adhesive to permeate into a gap between the end surface of the optical fiber and the opposed surface, wherein
the adhesive-filling section is filled with the second adhesive after fixing the optical fiber in the optical fiber hole with the first adhesive.

* * * * *